United States Patent Office 2,861,105
Patented Nov. 18, 1958

2,861,105

PROCESS OF PREPARING 2-HYDROXY-4-ALKOXYBENZOPHENONES

Lester N. Stanley, Delmar, and Stiles M. Roberts, Loudonville, N. Y., assignors to General Aniline & Film Corporation, New York, N. Y., a corporation of Delaware No Drawing. Application June 22, 1956
Serial No. 593,024

6 Claims. (Cl. 260—591)

This invention relates to 2-hydroxy-4-alkoxybenzophenones, and particularly to an improved process of preparing the same.

It is known that 2-hydroxy-4-alkoxybenzophenones are utilized as absorbents for ultraviolet light in various transparent sheet materials and for the stabilization of transparent plastics. When such compounds are utilized as ultraviolet absorbers in materials, such as plastics, resins, film forming materials, including colored textiles, and the like, it is extremely important that the compounds be of the highest degree of purity and stability upon storage.

The 2-hydroxy-4-alkoxybenzophenones can be prepared by several methods which are described in the literature. For example, B. König et al., Berichte 39, 4028 (1906), describes the preparation by alkylation of the corresponding 2,4-dihydroxybenzophenone and Kauffmann et al., Berichte 43, 1208 (1910), describes the preparation by de-alkylation of the corresponding 2,4-dimethoxybenzophenone.

A further method which has been employed is the condensation of an approximately molecular equivalent of benzoyl chloride with resorcinol dialkyl ether employing aluminum chloride as condensing and de-alkylating agent.

The principal shortcoming of the foregoing procedure is that the aluminum chloride alone is too reactive as a de-alkylating agent. The desired 2-hydroxy-4-alkoxybenzophenone is always contaminated with 2,4-dihydroxybenzophenone and other decomposition products. Inasmuch as it is essential for certain uses, such as ultraviolet absorbents for colorless organic film-forming plastics, resins, gums, waxes, etc., to utilize substantially pure 2-hydroxy-4-alkoxybenzophenones, the presently available process is incapable of yielding the said benzophenones in a high degree of purity.

We have discovered that the foregoing procedure can be improved decidedly to yield 2-hydroxy-4-alkoxybenzophenones of a high degree of purity and free from contaminants of the aforementioned type by replacing the aluminum chloride with a mixture of an alkali metal halide and aluminum chloride as the condensing and de-alkylating reagent.

By employing such a mixture, the activity of the aluminum chloride is so regulated that the benzoylation occurs in an easy manner, and when the condensation product is warmed in order to de-alkylate one of the alkoxy groups, the control of the reaction is facilitated, and as a result 2-hydroxy-4-alkoxybenzophenones are produced in a high degree of purity in a good yield and virtually free from contaminants.

Accordingly, it is an object of the present invention to provide an improved process of preparing 2-hydroxy-4-alkoxybenzophenones.

Other objects and advantages will become manifest from the following description:

The process involved in obtaining the foregoing compounds is carried out by first preparing the condensing and de-alkylating reagent which consists of the following:

2-component mixture

| Sodium Halide, percent by weight | Aluminum Chloride, percent by weight |
|---|---|
| 15–40 | 60–85 |

3-component mixture

| Sodium Halide, percent by weight | Potassium Halide, percent by weight | Aluminum Chloride, percent by weight |
|---|---|---|
| 5–16 | 5–25 | 59–90 |

The two-component or three-component mixture may be used as such by merely mixing it in a suitable solvent-diluent or in lieu thereof, the two-component or the three-component mixture may be first mixed and heated with stirring to a sufficiently high temperature to produce a melt. Usually a temperature of 110° C. is sufficient to heat the mixture, whereupon it continues to warm up from internal heat of reaction to 150–160° C. The resulting melt, after cooling, is readily soluble or dispersible in the inert solvent-diluent. Other variations of employing the mixtures will become evident from the working examples.

The sodium halide in the two-component and 3-component mixtures consists of sodium chloride, sodium bromide or sodium iodide, and the potassium halide in the three-component mixture consists of potassium chloride, potassium bromide or potassium iodide. When the two-component and three-component mixtures are employed, the amount to be utilized ranges from 140–215 parts by weight per 100–180 parts by weight of a 1,3-dialkoxybenzene.

With the reagent prepared, the second step in the process consists of dissolving a 1,3-dialkoxybenzene such as 1,3-dimethoxybenzene, 1,3-diethoxybenzene, 1,3-diisopropoxybenzene, 1,3-d-n-butoxybenzene, and 1,3-diisoamyloxybenzene, and the like, in an inert solvent-diluent such as for example, nitrobenzene, carbon disulfide, ethylene dichloride, 1,1,1-trichloroethane, acetylene tetrachloride, 1,1,2-trichloroethane, 1,3-dichloropropane, carbon tetrachloride, etc. The solution is cooled to between 0° C. and 10° C., and from 140–215 parts by weight of the two component or three-component mixture per 100–180 parts by weight of 1,3-dialkoxybenzene added with stirring, and the temperature maintained at 0°–10° C. Benzoyl chloride is run into this mixture in a suitable time, i. e. about one-half hour, while making certain that the temperature is below 10° C. After being held at this temperature for a period of time, e. g. ½–5 hours, the reaction mixture is heated gradually until a temperature of between 45–85° C., and preferably at about 65–70° C. is obtained. It is held at this temperature for a period of time ranging from 5–24 hours. The resulting reaction mixture is decomposed with an acidified ice water mixture, the temperature being held below about 10° C. At this point an additional quantity of an inert solvent-diluent is added, to dissolve the product. It may be warmed in order to effect solution, for example up to 70° C. The lower oil layer is separated, extracted with aqueous sodium hydroxide or any other suitable caustic alkali. The basic solution, after the removal of the residual solvent-diluent and acidification, e. g. with hydrochloric acid while maintaining a low temperature, e. g. below about 10° C., yields a buff colored solid which is filtered, sucked dry, washed with cold water until salt free and dried. One crystallization from a low boiling alcohol is sufficient to yield a product of high purity and virtually free from contaminants.

The following examples will illustrate the improved process. All the parts given are by weight unless otherwise noted.

*Example I*

A three-component mixture of the condensing and de-alkylating reagent was prepared by mixing together 20 grams of sodium chloride, 17.5 grams of potassium chloride, and 140 grams of aluminum chloride to yield a mixture weighing 177.5 grams. The mixture was heated to about 110° C., whereupon the temperature continued rising to about 150° C. while under constant agitation. The melt was cooled to 80° C., and 480 cc. of ethylene dichloride added. A substantial portion of the melt went into solution. The mixture was cooled to 0° C. 100 grams of 1,3-dimethoxybenzene were added while maintaining the solution at 0°–5° C. At this point 104 grams of benzoyl chloride was run into the reaction mixture in about one-half hour's time while maintaining the temperature below 10° C. The temperature was held at below 10° C. for one hour then heated for two hours until a temperature of 30° C. was obtained. It was further heated during a period of four hours until a temperature of 65° C. was reached. At this point the heating was continued at 65° C. for eight hours. The reaction mixture was cooled to 0° C. and run into a strongly acidic mixture of ice water and hydrochloric acid. The acidic reaction mixture was then warmed up to about 50–60° C. with agitation to take the product into the solvent, ethylene dichloride, layer. Agitation was discontinued and the layers allowed to separate. The aqueous layer was separated off and the heavy oil layer washed several times with water and separated. The solvent, ethylene dichloride, and unchanged 1,3-dimethoxybenzene were removed by steam distillation. The resulting product was then taken up with isopropanol at 70° C. and clarified with Nuchar through a filter. The filtrate was cooled to 0° C., and the product filtered off, washed with cold isopropanol and dried. A yield of approximately 117 grams (71% of theory) of an almost colorless product was obtained which had a melting point of 63°–64° C., and which is the melting point reported in the literature for the pure compound.

The proportions of the salts used in the melt in the foregoing example are as follows:

| | Percent |
|---|---|
| Sodium chloride | 11 |
| Potassium chloride | 10 |
| Aluminum chloride | 79 |

*Example II*

To 480 cc. of ethylene dichloride, 20 grams of sodium chloride, 17.5 grams of potassium chloride and 140 grams of aluminum chloride were added. The mixture was stirred for one hour, after which 100 grams of 1,3-dimethoxybenzene were added at 0°–5° C. While maintaining the reaction mass at this temperature, 104 grams of benzoyl chloride were run into it during about one-half hour's time. The temperature was then slowly raised to 30° C., to 35° C. in two hours, to 65° C. in four hours and held at 65° C. for eight hours. At this point the charge was drowned and worked up as in Example I using methanol for the solvent in the recrystallization. 100 grams of virtually pure 2-hydroxy-4-methoxybenzophenone was obtained having a melting point of 63 to 64° C. The proportions of the salts in the condensing and de-alkylating mixture were the same as in Example I.

*Example III*

To 400 cc. of ethylene dichloride at room temperature were added 28.2 grams of sodium bromide, 17.5 grams of potassium chloride and 140 grams of aluminum chloride. The charge was stirred for 30 minutes, then cooled to 0° C. 100 grams of 1,3-dimethoxybenzene were added at 0° C. and stirred well. At 0° C. 104 grams of benzoyl chloride were run into the reaction mixture in about one-half hour's time. The temperature was gradually raised to and maintained at 60°–65° C. for a period of 16 hours and the batch then finished as in Example I. An almost colorless product having a melting point of 63°–64° C. was obtained.

The proportions of the salts used in the condensing and de-alkylating mixture are as follows:

| | Percent |
|---|---|
| Sodium bromide | 15 |
| Potassium chloride | 9 |
| Aluminum chloride | 76 |

*Example IV*

To 480 grams of ethylene chloride were added 34 grams of sodium chloride. After cooling to 5° C., 140 grams of aluminum chloride were added. The batch was heated to reflux for a few minutes in order to obtain a solution, and then cooled to 0° C. 100 grams of 1,3-dimethoxybenzene were added and 104 grams of benzoyl chloride run into the reaction mixture in about one-half hour's time while maintaining the temperature at 0°–5° C. The charge was slowly raised to, and maintained at, 65° C. for about 16 hours, and then finished as in Example I. 110 grams (67% of theory) of 2-hydroxy-4-methoxybenzophenone having a melting point of 63°–64° C. were obtained.

The proportions of the salts in the two-component mixture are as follows:

| | Percent |
|---|---|
| Sodium chloride | 19 |
| Aluminum chloride | 81 |

*Example V*

Example I was repeated with the exception that the three-component condensing and de-alkylating reagent mixture was replaced by a mixture consisting of 16 grams of sodium chloride, 13.5 grams of potassium chloride and 112 grams of aluminum chloride. 105 grams (63% of theory) of 2-hydroxy-4-methoxybenzophenone were obtained, having a melting point of 63°–64° C. following a recrystallization from isopropanol and drying.

The proportions of the salts used in the de-alkylating mixture are as follows:

| | Percent |
|---|---|
| Sodium chloride | 8.7 |
| Potassium chloride | 13.8 |
| Aluminum chloride | 78 |

*Example VI*

Example II was repeated with the exception that the condensing and de-alkylating reagent was replaced by 24 grams of sodium chloride, 21 grams of potassium chloride and 168 grams of aluminum chloride. 110 grams (67% of theory) of 2-hydroxy-4-methoxybenzophenone were obtained with a melting point of 63°–64° C. after a single recrystallization from methanol, followed by drying.

The proportions of the salts in the de-alkylating mixture are as follows:

| | Percent |
|---|---|
| Sodium chloride | 11 |
| Potassium chloride | 11 |
| Aluminum chloride | 78 |

*Example VII*

Example I was repeated with the exception that 100 grams of 1,3-dimethoxybenzene were replaced by 120 grams of 1,3-diethoxybenzene. A buff colored product was obtained which had ultraviolet absorption properties similar to the product obtained from 1,3-dimethoxybenzene.

Example VIII

Example I was repeated with the exception that 100 grams of 1,3-dimethoxybenzene were replaced by 140 grams of 1,3-diisopropoxybenzene. A buff colored product was obtained which had ultraviolet absorption properties similar to the product obtained from 1,3-dimethoxybenzene.

Example IX

Example I was repeated with the exception that 100 grams of 1,3-dimethoxybenzene were replaced by 160 grams of 1,3-diisobutoxybenzene. A buff colored product was obtained which had ultraviolet absorption properties.

Example X

Example I was repeated with the exception that 100 grams of 1,3-dimethoxybenzene were replaced by 179 grams of 1,3-di-n-amyloxybenzene. A buff colored product was obtained which had ultraviolet absorption properties.

Example XI

Example I was again repeated with the exception that the condensing and de-alkylating melt was replaced by a melt consisting of 20 grams of sodium chloride, 35 grams of sodium iodide and 120 grams of aluminum chloride.

The product after a single recrystallization from methanol had a melting point of 63° to 64° C.

The proportions of the salt in the melt of the condensing and de-alkylating agent are as follows:

| | Percent |
|---|---|
| Sodium chloride | 11 |
| Sodium iodide | 20 |
| Aluminum chloride | 69 |

Example XII

Example I was again repeated with the exception that 17.5 grams of potassium chloride were replaced by 50 grams of potassium bromide prior to mixing and melting. A commensurate product was obtained.

The proportions of the salts in the melt mixture are as follows:

| | Percent |
|---|---|
| Sodium chloride | 11 |
| Potassium bromide | 23 |
| Aluminum chloride | 66 |

Example XIII

To 400 cc. of ethylene dichloride were added 20 grams of sodium chloride, 17.5 grams potassium chloride and 140 grams of aluminum chloride. The charge was stirred for one-half hour and then cooled to 0° C. To this was added 100 grams of 1,3-dimethoxybenzene. At 0° C., 104 grams of benzoyl chloride were added. The charge was then heated slowly up to about 65° C. and held for 10 hours. It was then finished as in Example I. 117 grams (71% of theory) of 2-hydroxy-4-methoxybenzophenone were obtained which had a melting point of 63°-64° C.

The proportions of the salts in the de-alkylating mixture were the same as in Example I.

Example XIV

To 1,500 cc. ethylene dichloride were added 414 grams of 1,3-dimethoxybenzene. At 0° C. 45 grams of aluminum chloride were added, and then at below 10° C., were added 432 grams of benzoyl chloride. It was held at below 10° C. for 1 hour, heated up to 65° C. in a period of 6 hours and held at that temperature for four hours. It was cooled and drowned in acidified ice water, the layers thus formed were separated, washed out with water and the excess ethylene dichloride distilled off. Vacuum distillation of the residue at 4 mm. yielded only a few cc. of product which distilled at 173°-175° C. (which is the temperature at which 4-methoxy-2-hydroxybenzophenone should distil). Most of the product distilled at 212°-215° C. The melting point of this latter was 140° C., whereas the desired 4-methoxy-2-hydroxybenzophenone has a melting point of 63°-64° C.

This experiment was repeated using instead of the aluminum chloride a mixture of 579 grams of aluminum chloride, 84 grams sodium chloride and 73.5 grams of potassium chloride. 167 grams of a product having a melting point of 61°-64° C. were obtained.

From the foregoing examples it becomes clearly evident that the replacement of the very active aluminum chloride by a mixture of salts containing aluminum chloride, a controlled de-alkylation is obtained, yielding at the same time a product of a high degree of purity. In addition, it is not necessary to employ absolute proportions of the eutectic mixtures comprising the condensing and de-alkylating reagents. There can be a very wide variation within certain limits as previously noted. Moreover, the sodium chloride may be substituted in part or entirely by sodium bromide or sodium iodide, and the potassium chloride by potassium iodide or potassium bromide.

We claim:

1. The process of preparing 2-hydroxy-4-alkoxybenzophenones which comprises first condensing a 1,3-dialkoxybenzene with benzoyl chloride at a temperature ranging between 0° and 10° C., in the presence of an inert solvent-diluent and in the presence of a reagent mixture selected from the group consisting of a two-component mixture of 15-40% by weight of a sodium halide and 60-85% by weight of aluminum chloride, and a three-component mixture consisting of 5-16% by weight of a sodium halide, 5-25% by weight of a potassium halide and 59-90% by weight of aluminum chloride, said two- and three-component mixture being employed in the range of 140-215 parts by weight per 100-180 parts by weight of said 1,3-dialkoxybenzene, then raising and holding the temperature between 45°-85° C. to de-alkylate the condensation product and isolating a 2-hydroxy-4-alkoxybenzophenone.

2. The process according to Claim 1 wherein the 1,3-dialkoxybenzene is 1,3-dimethoxybenzene.

3. The process according to Claim 1 wherein the 1,3-dialkoxybenzene is 1,3-diethoxybenzene.

4. The process according to Claim 1 wherein the 1,3-dialkoxybenzene is 1,3-diisopropoxybenzene.

5. The process according to Claim 1 wherein the 1,3-dialkoxybenzene is 1,3-diisobutoxybenzene.

6. The process according to Claim 1 wherein the 1,3-dialkoxybenzene is 1,3-di-n-amyloxybenzene.

References Cited in the file of this patent

Thomas: Anhyd. Aluminum Chloride in Org. Chem., pp. 315-316, 868-871 (1941).